United States Patent [19]

van Steenbergen

[11] Patent Number: 4,949,344

[45] Date of Patent: Aug. 14, 1990

[54] FAST PULSED EXCITATION WIGGLER OR UNDULATOR

[75] Inventor: Arie van Steenbergen, Shoreham, N.Y.

[73] Assignee: The United States of America as represented by the United States Department of Energy, Washington, D.C.

[21] Appl. No.: 368,618

[22] Filed: Jun. 20, 1989

[51] Int. Cl.$^5$ .............................................. H01S 3/00
[52] U.S. Cl. ................................................... 372/2
[58] Field of Search ........................................... 372/2

[56] References Cited

U.S. PATENT DOCUMENTS 4,864,575  9/1989  Ahern et al. ........................... 372/2

Primary Examiner—Léon Scott, Jr.
Attorney, Agent, or Firm—Vale P. Myles; Helen S. Cordell; William R. Moser

[57] ABSTRACT

A fast pulsed excitation, electromagnetic undulator or wiggler, employing geometrically alternating substacks of thin laminations of ferromagnetic material, together with a single turn current loop excitation of the composite assembly, of such shape and configuration that intense, spatially alternating, magnetic fields are generated; for use as a pulsed mode undulator or wiggler radiator, for use in a Free Electron Laser (FEL) type radiation source or, for use in an Inverse Free Electron Laser (IFEL) charged particle accelerator.

4 Claims, 2 Drawing Sheets

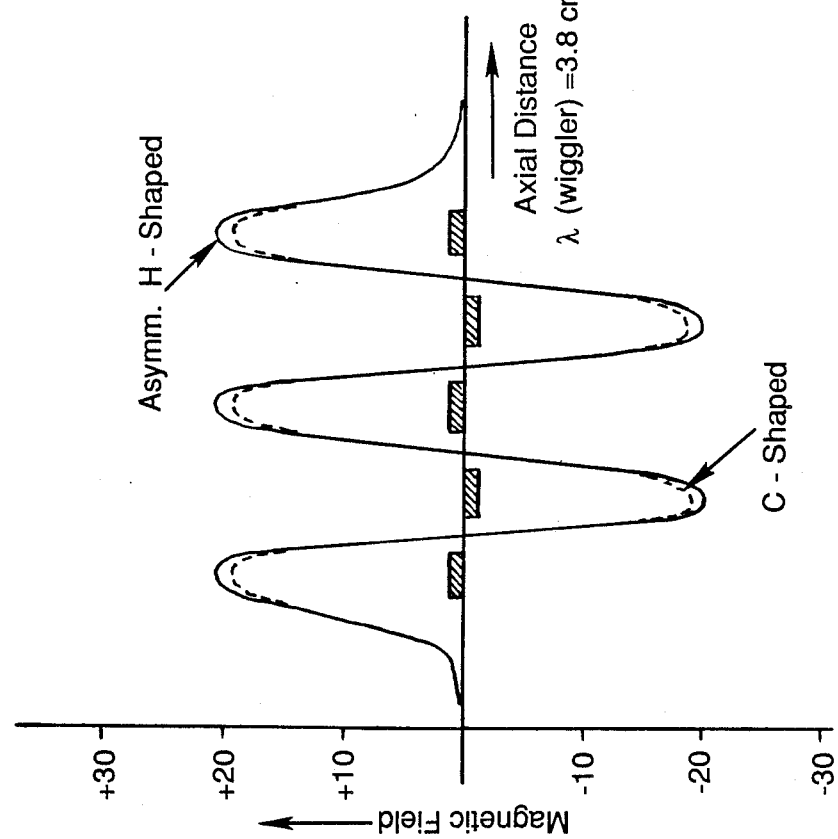
Fig. 4
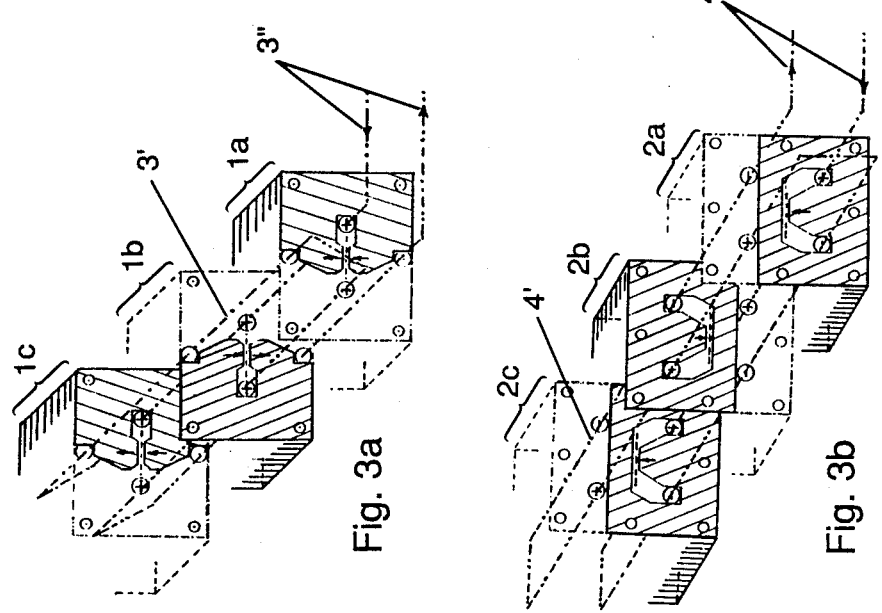
Fig. 3a
Fig. 3b

FAST PULSED EXCITATION WIGGLER OR UNDULATOR

This invention was made with Government support under contract number DE-AC02-76CH00016, between the U.S. Department of Energy and Associated Universities, Inc. The Government has certain rights in the invention.

BACKGROUND OF THE INVENTION

Free electron laser (FEL) systems require the use of electromagnetic undulators or wigglers. In an FEL system, transfer of energy takes place from the primary electron beam to a radiation wave in the medium of an alternating magnetic field developed within either an undulator or a wiggler assembly. In a similar manner, undulators or wigglers are essential in the implementation of an Inverse-Free Electron Laser Particle Accelerator (IFELA) system. For a typical IFELA, the transfer of energy is made from an intense radiation wave to an electron beam while the beam is colinearly traversing the undulator or wiggler assembly. It is possible to achieve a high energy gain per unit length within such an electron accelerator. An IFEL electron accelerator may make use of a quasi-sinusoidal magnetic field, with constant maximum field amplitude, and with varying undulator or wiggler lengths. Depending upon the beam injection energy into such an IFEL linear accelerator, this so-called period length may vary from a few centimeters up to several times such a period length for given assemblies.

Although such a structure could possibly be constructed using presently known techniques, employing permanent magnet material, the resultant cost of manufacture would be very high because of the non-repeat feature of the undulator or wiggler length. The use of conventional direct current electromagnetic excitation of undulator or wiggler assemblies by means of a multiplicity of individual pole coils is excluded from such design considerations, because of the small value of the period length at beam injection for a typical set of IFELA parameters.

OBJECTS OF THE INVENTION

It is a primary object of the present invention to provide a fast-pulsed excitation electromagnetic undulator or wiggler assembly for use in connection with an Inverse Free Electron Laser particle accelerator, which assembly affords ready manufacture of the structure using varying undulator or wiggler period lengths and block integration of the overall structure.

Another object of the invention is to provide an undulator or wiggler assembly that utilizes a plurality of substacks of generally C-shaped magnet laminae, wherein the substacks are assembled with the opening in their respective C-shape facing in opposite directions for adjacent substacks.

Yet another object of the invention is to provide an undulator or wiggler assembly utilizing a plurality of substacks of magnetic laminae each of which are generally H-shaped asymmetric magnets, wherein adjacent substacks are arranged in opposite facing relationship in the structural assembly, and a single excitation conductor loop is disposed within the respective legs of the H-shaped cutout configuration.

Additional objects and advantages of the invention will become apparent to those skilled in the art from the description of it presented herein considered in conjunction with the accompanying drawings.

BRIEF DESCRIPTION OF THE DRAWINGS

FIG. 3a illustrates an articulated wiggler or undulator assembly constructed according to the invention, and including three generally C-shaped substacks of laminae that are arranged with adjacent substacks facing in opposite directions. The substacks are held in alignment by straight tie rods positioned through aligned apertures in the respective substacks, and a single-loop conductor is disposed through the openings of the C-shaped laminae.

FIG. 3b illustrates an exploded isometric view of an undulator or wiggler assembly formed of a plurality of adjacent substacks of generally asymmetric H-shaped laminae, wherein the adjacent substacks are faced in opposite directions, as shown, and a single-loop energizing conductor is disposed in the opposite ends of the cross-bar opening in the laminae.

FIG. 4 is a graph illustrating plots of the magnetic field relative to axial length of a wiggler assembly constructed according to the invention, and showing plots of axial field distribution for such a wiggler assembly using both generally C-shaped (dashed line) and generally asymmetric H-shaped (solid line) laminae substack assemblies.

SUMMARY OF THE INVENTION

In preferred embodiments of the invention an undulator or wiggler assembly is made of a plurality of C-shaped, or asymmetric H-shaped, laminae substacks. The substacks are arranged in the assembly so that adjacent substacks face in opposite directions. A single loop conductor having straight sides that parallel the longitudinal axis of the assembly, is mounted in aligned openings through the laminae substacks to energize the assembly.

DESCRIPTION OF THE PREFERRED EMBODIMENT

In a preferred embodiment of the invention there is described a basic design and assembly execution of a fast, pulsed excitation, electromagnetic undulator or wiggler assembly, which may have either constant or variable period lengths, and which makes use of geometrically alternating substacks of substantially identical ferromagnetic-material laminations. The fast-pulsed current excitation capability of such assemblies, in combination with the shaped ferromagnetic material laminations and their unique sequential arrangements within the undulator or wiggler assembly substacks is designed to yield assemblies that are capable of spacially alternating, high-field flux magnitudes. As described herein, two different types of specifically configured ferromagnetic laminations are used to form substack laminae assemblies for an undulator or wiggler structure constructed according to the invention. It will be understood that in alternative embodiments of the invention, other shapes of such lamina for the substacks may be utilized, following the teachings of the invention presented herein.

Figure 1A:
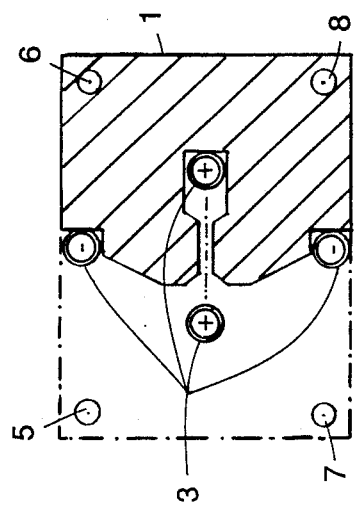
FIG. 1a is a top plan view of a C-shaped magnetic lamina formed according to the invention, for use as an undulator or wiggler assembly component, and shown in stacked relationship to the phantom outline of an adjacent substack of such laminae, which are faced in an opposite direction.
Figure 1B:
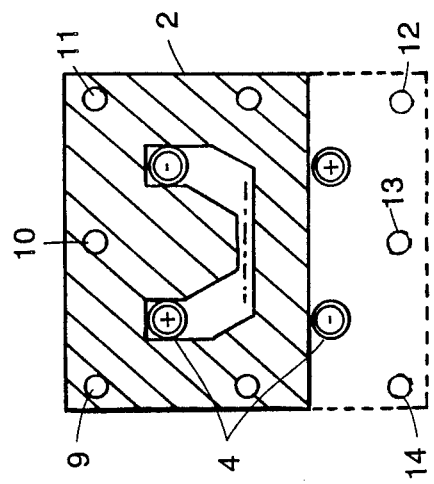
FIG. 1b illustrates an asymmetric H-shaped magnetic lamina, and an associated single-loop current conductor positioned in the opposite ends of the asymmetric cross bar of the asymmetric H-shaped configuration. Also illustrated in phantom is the outline of an adjacent substack for an undulator or wiggler assembly, wherein the asymmetric H-shaped laminae of the substack are faced in an opposite direction relative to the laminae in the first substack.

The basic substacks of the first disclosed embodiment of the invention make use of a generally C-shaped magnet configuration, whereas the second disclosed embodiment makes use of a generally asymmetric H-shaped magnet lamina configuration. These two configurations are shown respectively in FIGS. 1a and 1b. As shown in FIG. 1a, the C-shaped lamina 1 is illustrated in top plan view, and as shown in FIG. 1b, the generally asymmetric H-shaped lamina 2 is also shown in top plan view. In the preferred embodiments being described, a suitable conventional material for forming the laminae 1 and 2 is that sold under the trade name Supermendur, and the laminae may, for example, have a material thickness of about 0.01 inch. FIGS. 1a and 1b also illustrate, relative to a laminae substack cross section, with an adjacent substack being outlined in phantom, the straight-sided, parallel sides of a single-loop energizing conductor 3 (in FIG. 1a) and 4 (in FIG. 1b). The orientation of these conductors is more clearly illustrated in FIGS. 3a and 3b, which will be described more fully below. Four tie rods, 5, 6, 7 and 8 are shown in FIG. 1a, disposed through aligned apertures in the substack assemblies, for securing the assemblies in their assembled position. Similarly, 6 tie rods 9-14 are illustrated in FIG. 1b for holding the substacks of that assembly in aligned position. Of course, other securing arrangements may be utilized in alternative embodiments of the invention.

Figure 2A:
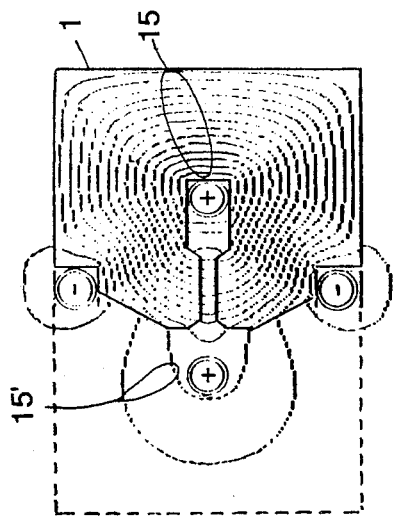
FIG. 2a is a top plan view showing a generally C-shaped laminae substack, such as that illustrated in FIG. 1, and illustrating a single-loop energizing conductor disposed in the opening of the C-shape of the illustrated substack and of the adjacent substack which is shown in phantom. The dotted lines illustrate the magnetic flux pattern that is generated by the single-loop conductor and that is shaped by the laminae in the substacks.
Figure 2B:
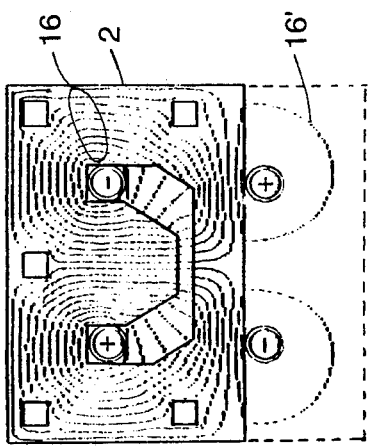
FIG. 2b illustrates an asymmetric H-shaped lamina, such as that illustrated in FIG. 1b, having a single loop energizing conductor disposed in the extremities of the opening cross-bar of the asymmetric H-shaped configuration and showing the magnetic flux path in dotted lines, as it would be generated by such a conductor and configured by the laminae in the substacks.

The basic configurations of the magnetic laminae substack assemblies of the invention, and their associated energizing conductors, develop two-dimensional magnetic field distributions that are shown respectively in FIGS. 2a and 2b. The flux lines are designated generally by the number 15 in FIG. 2a and by the number 16 in FIG. 2b. It will be understood that the flux lines 15', and 16', respectively in FIGS. 2a and 2b, extend outward from the illustrated substacks of laminae 1 and 2 into the airspace above the outline of the adjacent substack assemblies that are illustrated in the respective drawings.

FIGS. 3a and 3b illustrate a basic assembly sequence in simplified outline form, for both of the disclosed types of magnetic laminae configuration. In the illustrated assemblies, the laminae substacks are pre-assemblied in quarter period length ($\lambda/4$) thickness substacks, where $\lambda$ is the period length. Although it is not specifically so illustrated in FIGS. 3a and 3b, in the preferred embodiments of the invention each of the laminae substacks are separated by having inserted between them a sheet of dielectric material such as a suitable, high compression plastic sheet, so that upon compression of a lamination stack assembly, a desired "block" integration of the overall assembly is achieved. A single loop energizing conductor is illustrated in FIG. 3a as comprising four straight sided current conductor sections, each of which are parallel to the axis of the composite wiggler or undulator assembly, and each of which are interconnected only at the opposite ends of the total assembly, as shown by the dotted lines for the conductor 3' in FIG. 3a and for the conductor 4' in FIG. 3b. The arrows 3" in FIG. 3a and 4" in FIG. 3b indicate the direction of energizing current through the respective single excitation loops for the associated undulator or wiggler assemblies.

Such a simplified design arrangement permits ease of substack assembly and compression and final integration of the overall structural assembly. Although only three laminae substacks 1a, 1b, 1c, and 2a, 2b, and 2c are shown respectively in FIGS. 3a and 3b, it will be understood that in alternative embodiments of the invention different numbers of such substack assemblies may be readily used to form different period lengths for the desired undulator or wiggler structural assembly. These view of the preferred embodiments of the invention also make it clear that in FIG. 3a, the substacks 1a and 1c are arranged to face in an opposite direction to that of substack 1b, and a similar opposite facing arrangement for the substacks 2a and 2c versus substack 2b is illustrated in FIG. 3b, according to the basic teaching of the present invention. Thus, a major advantage of the present invention is seen to be the extreme simplicity of its structural geometry and the resultant ease of employing either constant period length or sequentially varying period length for undulator or wiggler structural assemblies, because of the laminated nature of the substack assemblies and the configuration of the associated excitation current loop.

A further major advantage of the present invention is that the longitudinal "coupling" of the transverse (up-down) magnetic field distributions will diminish the maximum achievable field magnitude in the undulator or wiggler, for a specific excitation current. This effect has been measured in simple short (2.5 period lengths) models of prototypes of the devices of the invention, and it has been found to be less than 5% for a period length of $\lambda = 3.8$ cm test model. A measured axial field distribution of such a prototype model is shown in FIG. 4.

It will be appreciated by those skilled in the art that in their excitation time structures, the devices of the invention are well matched for use in a FEL system, or alternatively for a specific use in conjunction with an Inverse Free Electron Laser electron accelerator. The novel basic design and assembly arrangement of either a constant or a variable period length, fast-pulsed excitation, electromagnetic undulator or wiggler, according to the invention, makes use of geometrically alternating substacks of identical magnetic material laminations, in the novel arrangements illustrated in the drawings and described above. A particular advantage of the disclosed assembly arrangement is that it involves the use of fast-pulses excitation, in combination with the use of specially shaped magnetic material laminations and their unique manner of assembly in "block" integrated, compressed substacks, which are designed to lead to the achievement of undulators and wigglers with high field, variable period length products, which not only may be especially matched to their use in conjunction with and Inverse Free Electron Laser electron accelerator, or in conjunction with a Free Electron Laser type radiation source, but also may reveal new paths in the development of compact, lightweight, high power efficiency, electromagnetic radiation devices when combining an undulator or wiggler of the type described herein with a pulsed excitation electron accelerator. Implicit in the basic geometry of the assemblies of the invention, in both of its disclosed embodiments, is a resultant assembly that lends itself to the use of a superconducting current loop, instead of a fast-pulsed excitation loop. Accordingly, the present invention forms a basic design for an embodiment of a direct current excitation superconducting undulator or wiggler assembly.

It will be apparent to those skilled in the art that various alternative forms and modifications of the invention may be developed from the teaching presented herein; accordingly, it is my intention to encompass within the following claims the true spirit and scope of the invention.

I claim:

1. A fast pulsed excitation electromagnetic undulator or wiggler assembly comprising a plurality of substacks of magnetic laminae wherein each lamina is configured in a generally C-shape, and includes a plurality of spaced apertures through it, some of which apertures permit the insertion of straight tie rods through them when the substacks are arranged in their assembled positions, and some of which apertures permit the insertion of straight electrical conductors through them when the substacks are arranged in their assembled positions, a single turn high current capacity conductor having generally straight sides that are positioned respectively in some of said apertures, and are electrically connected at the opposite ends of the conductors to define a current conducting loop, the principal excitation components of said loop being its straight sides which are disposed parallel to the longitudinal axis of the assembly when said substacks are in their assembled positions, a plurality of straight tie rods each positioned through a respective one of said apertures when the laminae substacks are in their assembled position, and a plurality of non-magnetic spacer sheets each positioned respectively between adjacent pairs of said laminae substacks to provide spatial separation of the substacks when they are compressed toward one another and secured in that compressed position by the tie rods, adjacent substacks of said laminae being arranged to face in opposite directions.

2. An undulator or wiggler assembly as defined in claim 1 wherein said generally C-shaped laminae are replaced by generally asymmetric H-shaped laminae, each of which include a similar arrangement of apertures therethrough as those in said generally C-shaped laminae, for accepting tie rods and the generally straight sides of a single energizing conductor.

3. An invention as defined in claim 2 wherein said excitation current loop is replaced by a superconducting current loop for a direct current driven wiggler or undulator assembly.

4. An invention as defined in claim 1 wherein said excitation current loop is replaced by a superconducting current loop for a direct current driven wiggler or undulator assembly.

* * * * *